United States Patent
Alsterlid et al.

(10) Patent No.: US 9,106,604 B2
(45) Date of Patent: Aug. 11, 2015

(54) METHOD AND ARRANGEMENT FOR SERVICE SHARING

(75) Inventors: Stefan Alsterlid, Linkoping (SE); Miro Karjalainen, Linkoping (SE); Bo Kvarnstrom, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 235 days.

(21) Appl. No.: 13/704,777

(22) PCT Filed: Jul. 1, 2010

(86) PCT No.: PCT/EP2010/059371
§ 371 (c)(1),
(2), (4) Date: Dec. 17, 2012

(87) PCT Pub. No.: WO2012/000553
PCT Pub. Date: Jan. 5, 2012

(65) Prior Publication Data
US 2013/0097289 A1    Apr. 18, 2013

(51) Int. Cl.
*H04L 29/08* (2006.01)
(52) U.S. Cl.
CPC .............. *H04L 67/00* (2013.01); *H04L 67/02* (2013.01); *H04L 67/16* (2013.01)
(58) Field of Classification Search
USPC ......... 709/219, 217, 218, 228, 238, 250, 224; 370/254
See application file for complete search history.

(56) References Cited

U.S. PATENT DOCUMENTS

| 7,480,712 | B2 * | 1/2009 | Moy | 709/223 |
| 2004/0255302 | A1 * | 12/2004 | Trossen | 719/318 |
| 2007/0260708 | A1 * | 11/2007 | Beaton et al. | 709/219 |
| 2011/0182205 | A1 * | 7/2011 | Gerdes et al. | 370/254 |

FOREIGN PATENT DOCUMENTS

| WO | 2006090243 A1 | 8/2006 |
| WO | 2007113164 A1 | 10/2007 |

* cited by examiner

*Primary Examiner* — Ranodhi Serrao
(74) *Attorney, Agent, or Firm* — Patent Portfolio Builders, PLLC

(57) ABSTRACT

A method and arrangement in a first web server (202) of a first local network (200) for snaring local services with other local networks (204). The first web server (202) detects (2:1) local services configured in one or more devices (D1, D2, D3 ... ) present in the first local network, and creates (2:2) an aggregated service record (I) that includes a selection of detected local services to become available remotely for devices in the other local networks. The first web server (202) then distributes (2:3) the aggregated service record to web servers (WS) of the other local networks for exposure to devices in the other local networks. Thereby, users in the other networks (204) can discover what services are available in the first local network (200) without requiring a connection to the first local network.

16 Claims, 4 Drawing Sheets

METHOD AND ARRANGEMENT FOR SERVICE SHARING

CROSS-REFERENCE TO RELATED APPLICATION

This application is a 35 U.S.C. §371 National Phase Entry Application from PCT/EP2010/059371 filed Jul. 1, 2010, and designating the United States, the disclosure of which is incorporated by reference herein.

TECHNICAL FIELD

The invention relates to a method and arrangement for sharing services in a collaboration group with a plurality of local networks in which local services are configured.

BACKGROUND

Techniques have been developed for communication of media and services in a local network with devices using internal addressing and transport means, which can also be referred to as a private or home network, a LAN (Local Area Network), a residential or office network. In this description, the term "local network" is used to represent any such networks, and the term "device" represents any communication entity capable of providing services in the local network. The devices in a local network may include any types of entities in which services are configured and managed, such as telephones, computers, application servers, web servers, and various devices related to home surveillance, home automation and health care.

UPnP (Universal Plug-and-Play) is a technology for establishing standardised device protocols for communication in a local network between different devices that may use different access technologies, operating systems, programming languages, format standards and communication protocols. UPnP supports a process called "discovery" in which a device can join a local network and exchange capabilities and share services with other devices in the network. The media and services available in the local network are typically "exposed", i.e. presented through a suitable interface, to the local devices by means of a web server or the like. A local network typically also has a gateway function for enabling external communication for devices in the local network. This gateway is often called "RGW" (Residential Gateway) or "HG" (Home Gateway), the latter being used by the standard organisation HGI (Home gateway Initiative).

A network architecture called IMS (IP Multimedia Subsystem) has been developed as a platform for handling and controlling multimedia services and sessions. In order to provide IMS-based services for devices in a limited local network and to enable multimedia communication with entities outside the local network, a gateway commonly called "HIGA" (Home IMS Gateway) has been devised as a solution where an external IMS core is used for establishing sessions with external entities.

UPnP also defines a mechanism for remote access, enabling a remote UPnP device located outside the local network to communicate with UPnP devices located within the local network. In FIG. 1, a local network 100 comprises various different devices D1-D4 in a family residence or an office, also employing gateway functions for external communication, in this case including a HIGA 100a and an RGW 100b, the latter typically having a NAT (Network Address Translation) function and a local DHCP (Dynamic Host Configuration Protocol) server for managing local IP addresses of the devices which are valid only locally within the network 100, as is well-known in the art. In practice, the HIGA 100a may be physically integrated in the RGW 100b to form a gateway node.

FIG. 1 also illustrates an opposite local network 102 which has a similar structure and entities as network 100, although not shown in detail here. UPnP also enables a user of a device D5 in network 102 to remotely access media and services from a device in network 100 as follows. The HIGA 100a is involved in IMS signalling with a corresponding HIGA or an IMS-enabled device in network 102 over an IMS core 104, as shown by an action 1.1, in order to establish a connection for communication between the two local networks 100, 102. Typically, a VPN (Virtual Private Network) tunnel is setup as a connection between RGW 100b and a corresponding entity in network 102, as shown by an action 1:2.

The above HIGA or RGW may be used as a web server for exposing available media and services to both devices in network 100 and remote devices in network 102. Thereby, the user of device D5 in network 102 is able to browse for media and services locally configured in network 100, e.g. in device D4, over the established VPN tunnel, as shown by an action 1:3. If some service in device D4 is selected by the browsing user in network 102, a session over the RGW 100b for service usage is executed, as shown by an action 1:4.

The known solutions for remote access, including the one described above, thus require that a point-to-point connection is established between the two local networks, typically a VPN tunnel, before a remote user is able to browse and find out what media and services are available in the opposite local network. This laborious procedure must actually be performed each and every time a user wants to search for remote services, even if no service is actually selected and used. It becomes an even greater burden when the user wants to see available services in more than one local network, e.g. in the residences of various friends, associates and connections, also involving considerable amounts of signalling that consume network and processing resources.

Another restriction is that the current solutions for remote access to a local network offer access control chiefly depending on the accessing device, such that either all or nothing of the media and services in a local network is shown to a browsing remote device. As a result, the entire selection of services in a home must be shared with others, if at all, and selective sharing of only some services is thus not enabled in current solutions unless access rules or the like are configured in the local network specifically for each remote user which is a rather complex procedure.

Further, when establishing a connection between devices in two opposite local networks, the risk of collision between local network addresses arises when potentially overlapping private address spaces are used within the networks. There is typically no coordination of address allocation between different local networks, which is commonly handled independently by DHCP servers in the respective networks. So this problem of overlapping address spaces must also be solved to enable the above browsing procedure.

SUMMARY

It is an object of the invention to address at least some of the limitations, problems and issues outlined above. It is also an object to improve the process of browsing for remote services in one or more opposite local networks. It is possible to achieve these objects and others by using a method and an arrangement as defined in the attached independent claims.

According to one aspect, a method is provided in a first web server of a first local for sharing local services with other local networks. In this method, the first web server detects local services configured in one or more devices present in the first local network, and creates an aggregated service record that includes a selection of detected local services to become available remotely for devices in the other local networks. The aggregated service record is then distributed to web servers of the other local networks for exposure to devices in the other local networks. Thereby, users in the other networks can discover what services are available in the first local network, e.g. by browsing the exposed service record, without requiring a connection to the first local network.

According to another aspect, an arrangement is provided in a first web server of a first local network, configured for sharing local services with other local networks. The arrangement comprises a detecting module adapted to detect local services configured in one or more devices present in the first local network, and a creating module adapted to create an aggregated service record (I) that includes a selection of detected local services to become available remotely for devices in the other local networks. The arrangement also comprises a distributing module adapted to distribute the aggregated service record to web servers of the other local networks for exposure to devices in the other local networks.

The above method and arrangement may be configured and implemented according to different embodiments. In one example embodiment, service records of remotely available services are received from the web servers of the other local networks, and the received service records are exposed to any of the one or more devices in the first local network. Thereby, a user of the exposed device is able to discover and select a service from those service records for usage. The received service records may be exposed jointly in an internal service record, and the detected local services of the first local network may be exposed as well in the internal service record. The received service records may be exposed by means of a browsing mechanism or by broadcasting within the first local network.

The first local network and the other local networks may form a pre-established collaboration group for sharing local services. In another example embodiment, the aggregated service record is created by applying at least one predefined filter to provide network specific views of available local services for the different other local networks. If the first local network has joined a plurality of collaboration groups for sharing local services, different predefined filters may be applied to provide group specific views of available local services for the different collaboration groups.

In further example embodiments, the aggregated service record can be distributed by sending the record directly to the web servers in the other local networks, or by publishing the record in a presence server. In the latter case, the web servers of the other local networks receive a notification with the aggregated service record from the presence server based on subscriptions according to the existing presence service framework.

Further, the services in the aggregated service record may be indicated by service URLs (Universal resource Locator) each including a prefix identifying the first local network, which can be used to access the corresponding service when selected by a user for usage.

Further possible features and benefits of this solution will become apparent from the detailed description below.

BRIEF DESCRIPTION OF DRAWINGS

The invention will now be described in more detail by means of some example embodiments and with reference to the accompanying drawings, in which.

DETAILED DESCRIPTION

Figure 1:
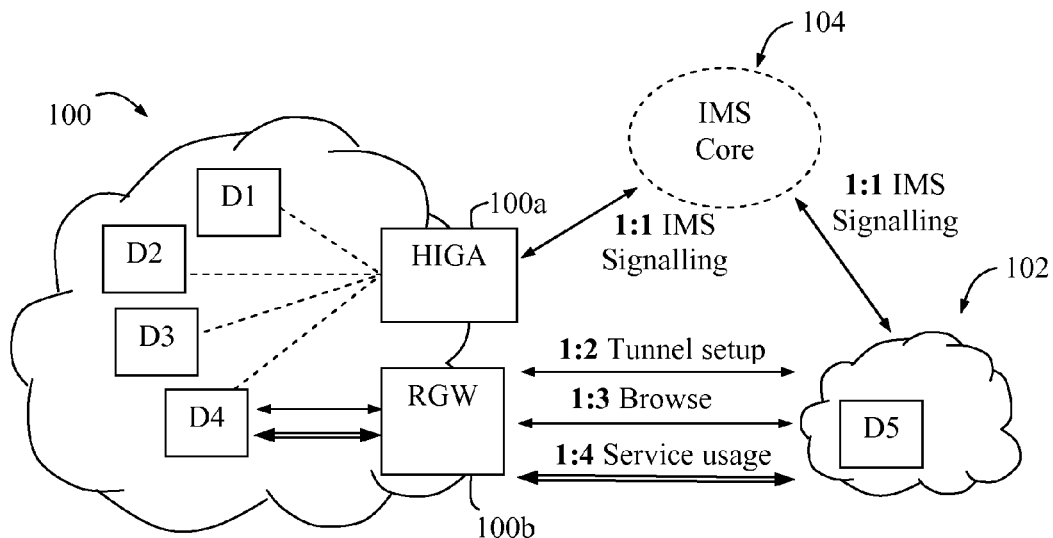
FIG. 1 is a communication overview for service usage across two local networks, according to the prior art.

Briefly described, a solution is provided that allows device users in one local network to discover services remotely available from other opposite local networks, without requiring establishment of a connection such as a VPN tunnel with each opposite network. A connection across two networks is only required once a remote service in an opposite network is actually to be used after being selected by the user. Thereby, the browsing and/or selection process can be performed locally without contacting the opposite network, which is substantially simpler as compared to prior solutions requiring a VPN tunnel or other connection across two networks to enable the browsing and/or selection of a remote service. The services discussed here may include, without limitation, functions related to home surveillance (e.g. intruder alarms), home automation (e.g. automated heat control) and health care (e.g. heart monitoring), as well as any computer applications and transfer of media being locally stored in the devices such as audio, video and document files.

In this solution, a first web server in a first local network initially detects what services are configured in devices present in the first network, e.g. by means of the above-mentioned conventional discovery process where each device announces its service capabilities. The first web server also aggregates the different services into a common selection or collection of services to be made remotely available for devices in other local networks of a pre-established collaboration group that has been formed to share local services in the manner described here. Aggregating the available services in the first local network includes documenting them in a service record or the like.

In this description, the term "service record" is used to represent any recorded or documented selection of services offered for use to remote devices in the collaboration group. The service record may be implemented as a list, directory, catalogue or register with available services and media. The service record may comprise any type of services that can be made available for remote usage, e.g. as exemplified above.

The first and other local networks are thus members of the collaboration group which may also include any solitary communication devices in addition to the local networks. Each member of the collaboration group may have a web server basically configured to share services according to this description. The term "web server" should be understood as any server of a local network capable of network communication according to the features and embodiments described herein.

The first web server then distributes the aggregated service record to other web servers in the collaboration group for local exposure to any devices connected to those other web servers e.g. in local networks. Before distributing the aggregated service record, the selection of offered services may be adapted or "tailored" for the receiving local networks by means of a filtering mechanism, e.g. to provide specific views of available local services to different networks, which will be described in more detail later below with reference to FIG. 6. It is also possible that the first local network can be a member of more than one collaboration group, and in that case different adapted service records may be created for exposure in different collaboration groups.

Users of the devices being exposed to a distributed service record are then able to see what services are available from the first local network by means of remote access. In this way, no connection is necessary to a remote local network for just discovering and selecting services from devices therein, which thus can be performed locally before a point-to-point connection is established, if necessary, across the networks. A user or administrator of the first local network is also able to determine exactly what services to make available to others by means of the aggregated service record, e.g. using the above filter mechanism. Further, access to various local services can be controlled by the above selective exposure and a common security schema may be used for the exposure independent of service.

Each entry in a distributed service record thus indicates a service available from the first local network, and may include a service URL (Universal resource Locator) that can be used for accessing the service if selected by a remote user. Further, the service URL may include a prefix or the like identifying the first local network and which the remote user's local network can use for setting up a remote access connection.

Figure 2:
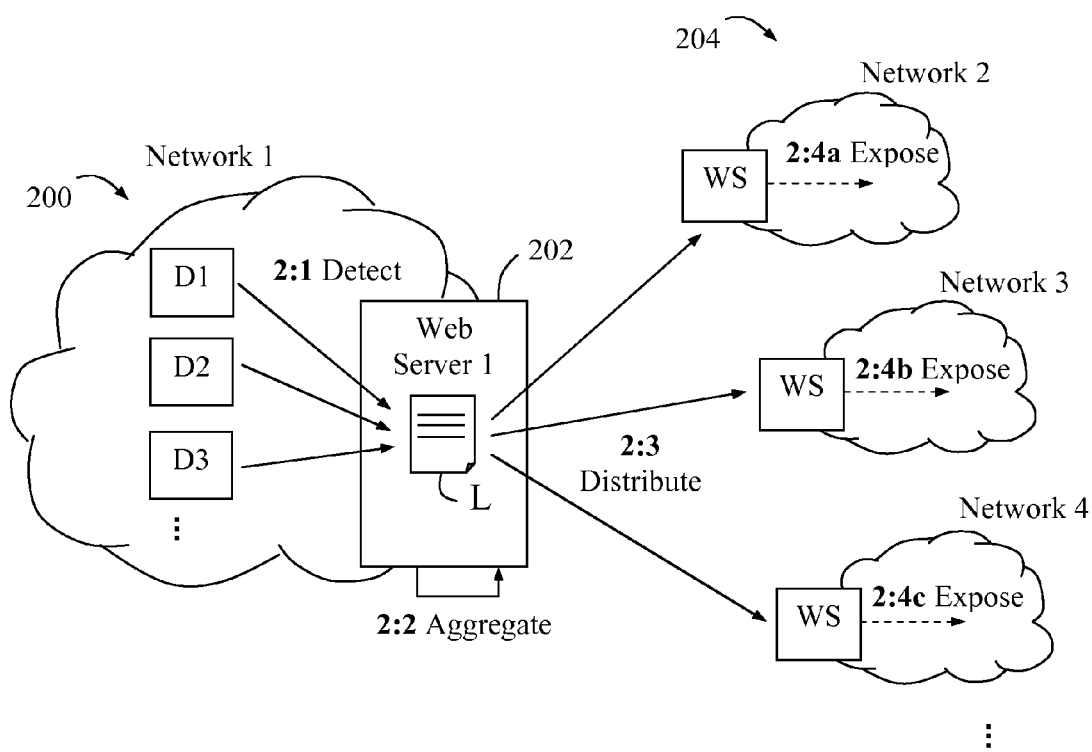
FIG. 2 is a communication overview when a web server in a first local network distributes service information to web servers in other local networks, according to a possible embodiment.

Features of this solution will now be described with reference to FIG. 2 illustrating an example procedure of distributing information on available services from a first web server 202 in a first local network 200 to web servers in other local networks 204. This procedure is illustrated by various actions which may each involve one or more messages and processing steps not necessary to describe in more detail to understand the solution. It is assumed that the first local network 200 has joined a collaboration group involving the other local networks 204, which has been pre-established for sharing local services according to this solution.

Thus, the first web server 202 of network 200 detects what services are configured in individual devices D1, D2, D3 . . . currently present in the local network 200, as shown in a first action 2:1, e.g. using the above discovery process. Individual devices may have local directories or the like with services and media being configured and stored in the devices which can be obtained and used by other devices. In this action, the first web server 202 basically collects these service and media directories or similar from devices D1, D2, D3 . . . in network 200.

In a further shown action 2:2, the first web server 202 creates an aggregated service record "L" that includes a selection of local services taken from the services detected in the previous action, e.g. identified in the form of URLs with prefixes identifying the local network 200, to become available remotely for devices in the other local networks 204. In this action, all or only some services can be selected from the local services, and different views can also be created for different networks and/or collaboration groups by means of a filtering mechanism, to be described further below. However, in this example only one service record L is created, e.g. in the form of a list of services and media available from the first network 200. The aggregated service record L can thus be created to only comprise services that are allowed for use by devices in the networks 204, while other services not to be shared can be left out from the record. Using aggregated service records in this way provides for great flexibility in allowing services for remote access in a granulated manner.

The first web server 202 then distributes the service record L to web servers "WS" in the other local networks 204, in a following action 2:3. In this action, the service record L may also be distributed to web servers of any sole communication devices, not shown, that may likewise be members of the collaboration group in addition to the local networks. Further, the service record L may be distributed to web servers in other collaboration groups as well, not shown. Each web server WS is now able to expose the received service record L internally to any device(s) in their local networks 2, 3, 4 . . . , as illustrated by final actions 2:4a, 2:4b and 2:4c, respectively.

Figure 3:
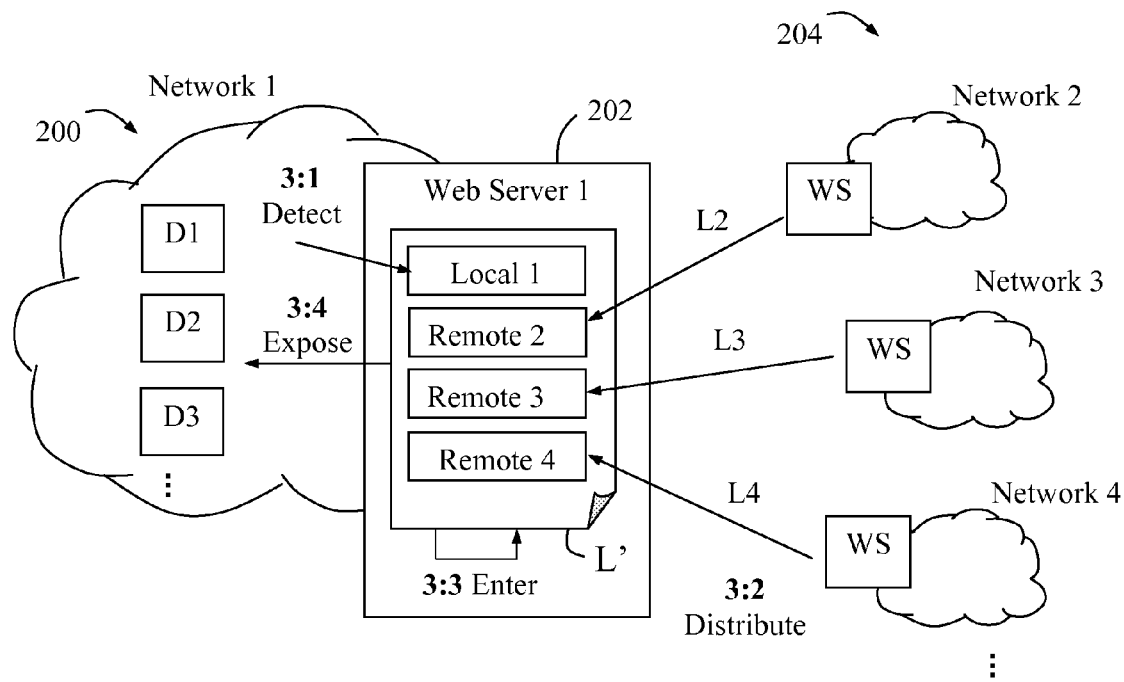
FIG. 3 is a communication overview when the web server exposes service information of other local networks to devices in the first local network, according to another possible embodiment.

Furthermore, the first web server 202 may also act in the manner described above for the receiving web servers WS, to expose services available from the other local networks 204, which is further illustrated in FIG. 3. In this example, the web server 202, in a first action 3:1, detects services being configured in the individual devices D1, D2, D3 . . . , basically as described for action 2:1 above. These discovered services are also entered in an internal service record L' to be exposed internally towards local devices in network 200, thereby forming a selection of locally available services denoted "Local 1" in the record L'.

In another action 3:2, the first web server 202 receives from the web servers of the other local networks 204, distributed service records L2, L3, L4 . . . presenting remotely available services being configured in devices of the respective networks 204. The web servers of the local networks 204 thus distribute their service records basically in the manner described for action 2:3 above, and will also distribute their service records L2, L3, L4 . . . to each other as well, not shown, all being part of the collaboration group. However, it may not be required that all members of a collaboration group must share its local services in this way, and some members, e.g. sole devices, may just receive service records from other members without distributing and sharing one itself.

A next action 3:3 illustrates that the first web server 202 enders the received service records L2, L3, L4 . . . in the internal service record L', thereby adding respective selections of services denoted "Remote 2", "Remote 3" and "Remote 4" in the record L'. Each received service record L2, L3, L4 . . . may comprise service URLs for the offered services and each service URL may include a prefix or the like identifying the respective local networks 204 and which can be used for setting up a remote access connection when a service is selected for use by a user in network 200.

The received service records of services remotely available from networks 204 are then exposed together with the service selection "Local 1" available from network 200, as the internal service record L' to at least one device D1, D2, D3 . . . in the first local network 200, in a final shown action 3:4. A user of the exposed device is then able to browse and/or select a service from the service record for usage. In this action, service record L' can be exposed in different ways, e.g. by a conventional browsing mechanism or by broadcasting the record L' to devices within the network 200.

The above procedure can be modified in different ways without departing from the invention for example, the locally available services of "Local 1" and the remotely available services of "Remote 2", "Remote 3" and "Remote 4" may be exposed in two or more separate internal service records instead of using a single internal service record with all services, depending on the implementation.

Figure 4:
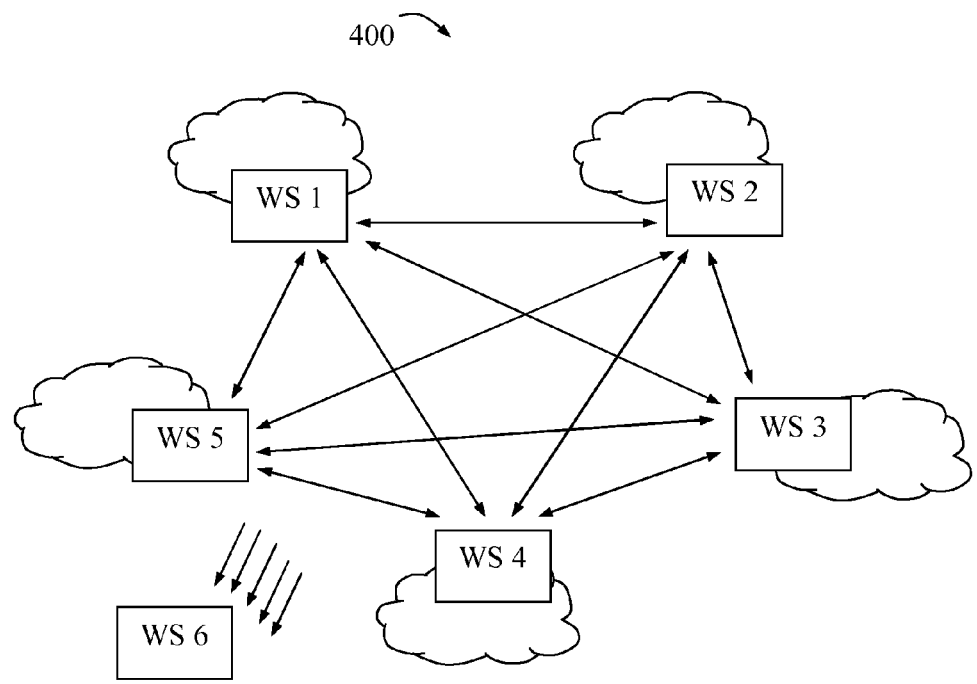
FIG. 4 is a communication overview of a collaboration group for sharing services, according to a possible embodiment.

FIG. 4 illustrates a possible collaboration group that has been formed with different members, each having a web server basically configured to act as the above-described first web server 202 for sharing their local services with each other. Thus, service records are distributed back and forth amongst the web servers W1-WS5, as indicated by various two-way arrows, while in this example the web server WS6 acts to only receive service records from the others without sharing any own services, as indicated by the one-way arrows towards WS6.

Figure 5:
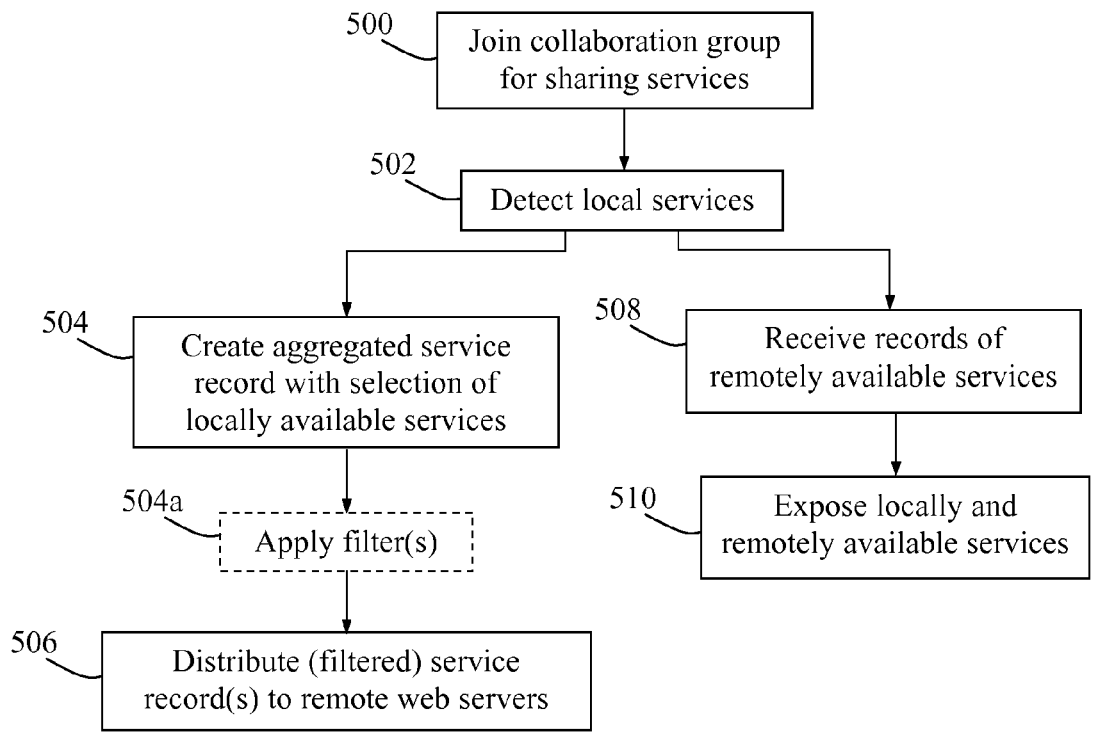
FIG. 5 is a flow chart with actions performed by a web server, according to further possible embodiments.

A procedure executed by a first web server of a first local network for sharing local services with other local networks, will now be described with reference to the flow chart in FIG. 5. This procedure may be implemented as an application in the first web server. In a first action 500, the first web server joins a collaboration group for sharing locally configured services with the other local networks being members of the group, e.g. by joining an existing group or a new group that is formed. It is assumed that the other local networks of the collaboration group likewise have web servers for mutual interaction according to this solution. The first web server also detects services being configured in one or more local devices currently present in the first local network, in a further action 502, e.g. using the existing discovery mechanism, basically as described for actions 2:2 above.

In a next shown action 504, the first web server creates an aggregated service record that includes a selection of detected local services to become available remotely for devices in the other local networks, basically as in actions 2:1 and 3:1 above. In this action, only some of the detected local services may be selected and different views can also be created for different networks and/or collaboration groups, as mentioned above. This possibility is illustrated by an additional action 504a in which a suitable filtering mechanism is applied, which can be regarded as an optional part of action 504. The aggregated and optionally filtered service record(s) is (are) then distributed to remote web servers of the other members of the collaboration group, in a following action 506.

Basically in parallel with and independent of the above actions 504-506, the first web server may also act to receive and internally expose service records distributed from the remote web servers as well. Thus, in a further shown action 508, the first web server receives from web servers in the other local networks, service records of remotely available services. The received service records of the remotely available services are then exposed to any of the one or more devices in the first local network, in a following action 510. In this action, the received service records may be exposed jointly in an internal service record as shown in FIG. 3 which could also include internally available services, or in a separate service record for each local network. Further, the exposure can be made when the user browses the service record(s), or by broadcasting them internally to devices in the first local network. Thereby, a user of an exposed device is able to discover and select a service from the service record for usage.

Figure 6:
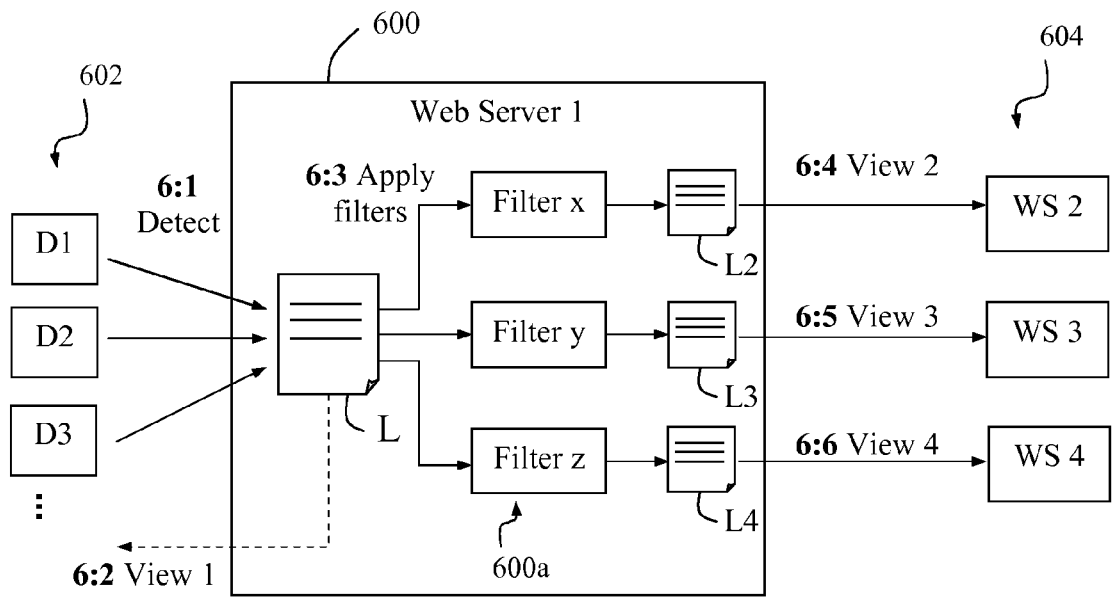
FIG. 6 is a block diagram illustrating in more detail how a web server distributes service information to other web servers in a collaboration group, according to another possible embodiment.

An example of using filters for providing differentiated views of available local services from a first local network will now be described with reference to FIG. 6. In this example, a first web server 600 in the first local network distributes service information to other web servers WS2, WS3 and WS4 in a collaboration group that has been formed for local networks served by the web servers WS1-W4. A first action 6:1 illustrates that web server 600 detects local services configured in devices 602 currently present in the first local network, basically as described for actions 2:1 and 3:1 above. The local services are collected in an aggregated service record L and a next action 6:2 illustrates that the first web server 600 exposes the locally available services in an internal view denoted "View 1" to the devices 602. This internal view of locally available services may encompass all the detected services and, as in the above examples, they could be exposed jointly with any remotely available services, not illustrated here.

A number of predefined filters 600a have been configured in the first web server 600, and in this example there is one filter configured for each remote network to present differentiated views thereto in the form of different service records as follows. A next action 6:3 thus illustrates that web server 600 applies different predefined filters x, y and z to the total amount of collected local services in service record L. In this action, applying filter x provides a service record 12 with a limited selection of services adapted for a second local network, applying filter y provides another service record L3 with services adapted for a third local network, and applying filter z provides yet another service record L4 with services adapted for a fourth local network.

The first web server 600 then distributes service record 12 as a view denoted "View 2" to a web server WS2 of the second local network in action 6:4, service record 13 as a view denoted "View 3" to another web server WS3 of the third local network in action 6:5, and finally distributes service record 14 as a view denoted "View 4" to yet another web server WS4 of the fourth local network in action 6:6. As mentioned above, the first web server 600 may also provide differentiated selections of offered services to different collaboration groups, by applying different filters according to the above mechanism. In this way, differentiated selections of available services can be tailored, with any optional and desired granularity, to different local networks and/or collaboration groups.

With reference to the block diagram in FIG. 7, an arrangement in a first web server 700 of a first local network, configured for sharing local services with other local networks, will now be described. This arrangement may be implemented as an application in the web server. The first web server 700 can be configured to basically operate according to any of the examples described above for FIGS. 2-5, whenever appropriate. According to this arrangement, the first web server 700 comprises a detecting module 700a adapted to detect local services "S" configured in one or more devices 702 present in the first local network.

Web server 700 also comprises a creating module 700b adapted to create an aggregated service record "L" that includes a selection of detected local services to become available remotely for devices in the other local networks, optionally by also applying one or more predefined filters stored in a filter storage 700f. Web server 700 also comprises a distributing module 700c adapted to distribute the aggregated service record, or filtered parts thereof, to web servers 704 in the other local networks.

Web server 700 may further comprise a receiving module 700d adapted to receive from the remote web servers 704, service records L2, L3, L4 . . . of remotely available services, and an exposing module 700e adapted to expose the received service records of remotely available services to any of the one or more devices 702 in the first local network. Thereby, a user of the exposed device is able to discover and select a service from a service record for usage.

The different modules in the first web server 700 may be configured and adapted to provide further optional features and embodiments. In one example embodiment, the exposing module 700e is further adapted to expose the received service records jointly in an internal service record and may also expose the detected local services of the first local network in the internal service record. Thereby, users in the first local network are able to see all available services in both the first and the other local networks in the same view. The exposing module 700e may be further adapted to expose the received service records by means of a browsing mechanism or by broadcasting within the first local network.

As in the previous examples, the first local network and the other local networks may form a pre-established collaboration group for sharing local services. The creating module 700b may be further adapted to create the aggregated service record L by applying at least one predefined filter to provide network specific views of available local services for the different other local networks. If the first local network has joined a plurality of collaboration groups for sharing local services, the creating module 700b may be further adapted to apply different predefined filters to provide group specific views of available local services for the different collaboration groups.

Figure 8:
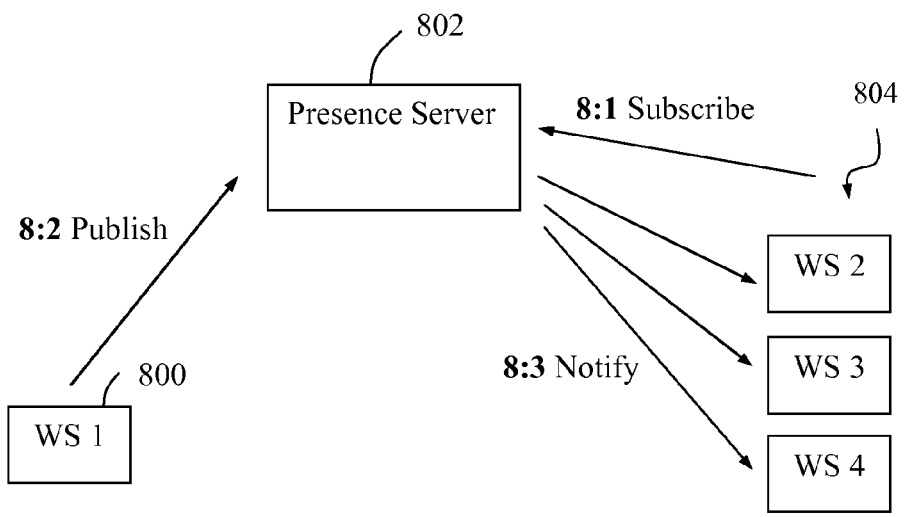
FIG. 8 is a communication overview illustrating one example of how service records can be distributed, according to another possible embodiment.

In another example embodiment, the distributing module 700c is further adapted to distribute the aggregated service record L by sending the record directly to the web servers 704 in the other local networks. Alternatively, the distributing module 700c may be adapted to distribute the aggregated service record by publishing the record in a presence server, not shown, such that the web servers 704 of the other local networks receive a notification with the aggregated service record from the presence server based on subscriptions according to the existing presence service framework, which is also illustrated in FIG. 8.

Figure 7:
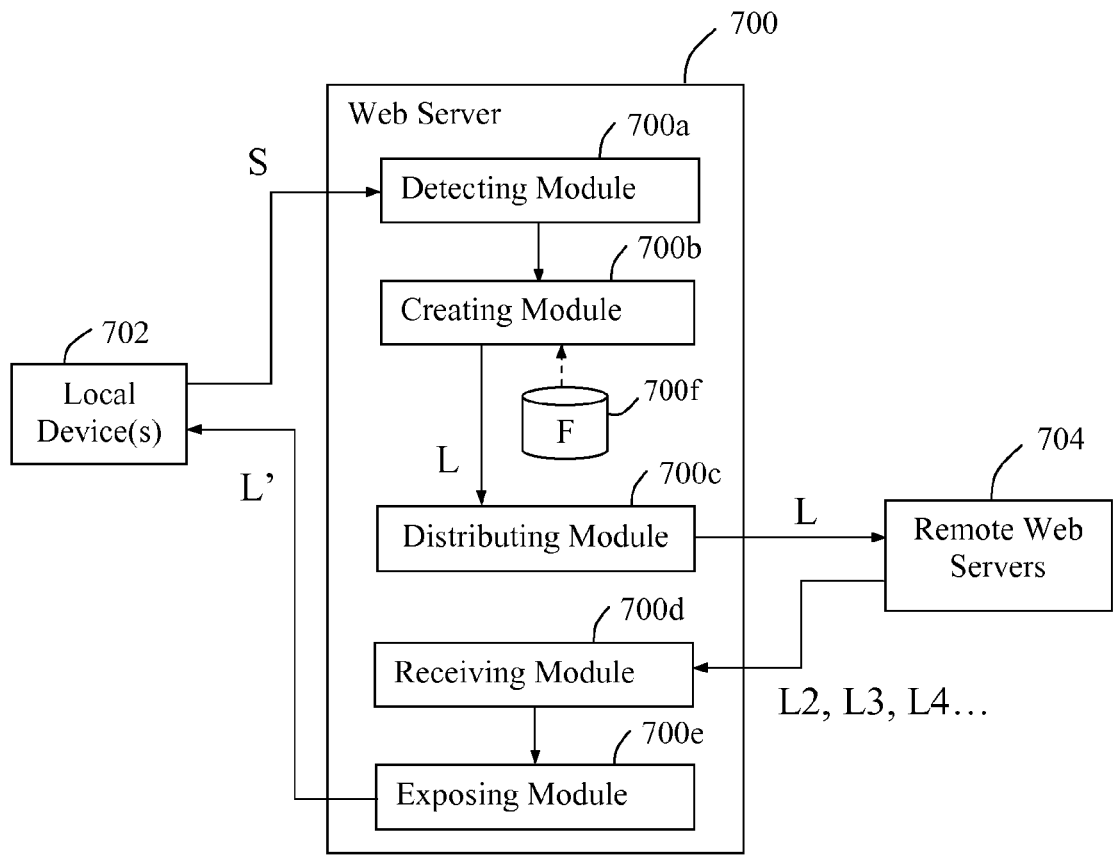
FIG. 7 is a block diagram illustrating in more detail an arrangement in a web server, according to further possible embodiments.

It should be noted that FIG. 7 merely illustrates various functional modules or units in the web server 700 in a logical sense, although the skilled person is free to implement these functions in practice using suitable software and hardware means. Thus, the invention is generally not limited to the shown structures of the web server 700, while its functional modules 700a-e may be configured to operate according to the features described for FIGS. 2-6 above and FIG. 8 below, where appropriate.

The functional modules 700a-e described above can be implemented in the web server 700 as program modules of a computer program comprising code means which when run by a processor in the server 700 causes the server 700 to perform the above-described functions and actions. The processor may be a single CPU (Central processing unit), or could comprise two or more processing units. For example, the processor may include general purpose microprocessors, instruction set processors and/or related chips sets and/or special purpose microprocessors such as ASICs (Application Specific Integrated Circuit). The processor may also comprise board memory for caching purposes.

The computer program may be carried by a computer program product in the server 700 connected to the processor. The computer program product comprises a computer readable medium on which the computer program is stored. For example, the computer program product may be a flash memory, a RAM (Random-access memory), a ROM (Read-Only Memory) or an EEPROM (Electrically Erasable Programmable ROM), and the program modules could in alternative embodiments be distributed on different computer program products in the form of memories within the web server 700.

The aggregated service record may be distributed in different ways from the first web server of the first local network described for FIGS. 2-7 above. For example, the first web server may send an aggregated service record, or one or more filtered views thereof, directly to the receiving web servers of the other local networks using a suitable communication protocol, such as sending the record in XML (Extensible Markup language) format using HTTP (Hypertext Transfer Protocol). Alternatively, as illustrated by a simplified communication scenario in FIG. 8, the aggregated service record can be distributed by means of a regular presence service framework, e.g. using regular SIP (Session Initiation Protocol) messages which is common practice for presence services.

In this example, a plurality of web servers 804 in other local networks establish subscriptions in a presence server 802 for information on what services are remotely available from the first network, in an action 8:1, e.g. using a regular "SIP Subscribe" message. Having created an aggregated service record from local services detected in a first local network, or different filtered views thereof, the first web server 800 publishes the record to the presence server 802, e.g. using a regular "SIP Publish" message. According to the above presence subscriptions, the web servers 804 receive a notification with the aggregated service record from presence server 802, e.g. using a regular "SIP Notify" message. In common presence terminology, web servers 804 act as "watchers" while the first web server 800 acts as "presentity".

While the invention has been described with reference to specific exemplary embodiments, the description is generally only intended to illustrate the inventive concept and should not be taken as limiting the scope of the invention. For example, the terms "device", "local network", "web server", "local services" and "service record", have been used throughout this description, although any other corresponding functions, parameters, nodes and/or units could also be used having the functionalities and characteristics described here. The invention is defined by the appended claims.

The invention claimed is:

1. A method in a first web server of a first local network for sharing local services with another local network, the method comprising:
   detecting local services configured in one or more devices present in the first local network,
   creating an aggregated service record that includes a selection of detected local services to become available remotely for devices in said other local network,
   distributing the aggregated service record to a web server of said other local network for exposure to devices in the other local network using the Hyper-Text Transfer Protocol (HTTP), and
   receiving from the web server of the other local network an HTTP message comprising a service record of remotely available services, and exposing the received service record to any of the one or more devices in the first local network, thereby enabling a user of the exposed device to discover and select a service from said service record for usage, wherein
   creating the aggregated service record comprises applying at least one predefined filter to provide network specific views of available local services for the different other local networks, and
   the first local network has joined a plurality of collaboration groups for sharing local services, and different predefined filters are applied to provide group specific views of available local services for the different collaboration groups.

2. The method according to claim 1, wherein the received service records are exposed jointly in an internal service record.

3. The method according to claim 2, wherein said detected local services of the first local network are also exposed in the internal service record.

4. The method according to claim 1, wherein the received service records are exposed by means of a browsing mechanism or by broadcasting within the first local network.

5. The method according to claim 1, wherein the first local network and said other local network are members of a pre-established collaboration group for sharing local services.

6. The method according to claim 1, wherein distributing the aggregated service record comprises sending said record directly to the web server in said other local network.

7. The method according to claim 1, wherein distributing the aggregated service record comprises publishing said record in a presence server such that the web server of the other local network receives a notification with the aggregated service record from the presence server based on subscriptions according to the existing presence service framework.

8. The method according to claim 1, wherein the services in the aggregated service record are indicated by service universal resource locators each including a prefix identifying the first local network.

9. A first web server apparatus of a first local network, configured for sharing local services with other local networks, comprising:
   a memory and a processor coupled to the memory, the processor being configured to:
   detect local services configured in one or more devices present in the first local network,
   create an aggregated service record that includes a selection of detected local services to become available remotely for devices in said other local networks,
   distribute said aggregated service record to web servers of said other local networks for exposure to devices in the other local networks using the Hyper-Text Transfer Protocol (HTTP),
   receive from web servers of said other local networks, an HTTP message comprising a service record of remotely available services, and
   expose the received service record of remotely available services to any of the one or more devices in the first local network, thereby enabling a user of the exposed device to discover and select a service from the service record for usage, wherein
   the processor is further configured to create the aggregated service record by applying at least one predefined filter to provide network specific views of available local services for the different other local networks, and
   the first local network has joined a plurality of collaboration groups for sharing local services, and the creating module is further adapted to apply different predefined filters to provide group specific views of available local services for the different collaboration groups.

10. The arrangement according to claim 9, wherein the exposing module is further adapted to expose the received service records jointly in an internal service record.

11. The arrangement according to claim 10, wherein the exposing module is further adapted to also expose said detected local services of the first local network in the internal service record.

12. The arrangement according to claim 9, wherein the exposing module is further adapted to expose the received service records by means of a browsing mechanism or by broadcasting within the first local network.

13. The arrangement according to claim 9, wherein the first local network and said other local networks form a pre-established collaboration group for sharing local services.

14. The arrangement according to claim 9, wherein the distributing module is further adapted to distribute the aggregated service record by sending said record directly to the web servers in said other local networks.

15. The arrangement according to claim 9, wherein the distributing module is further adapted to distribute the aggregated service record by publishing said record in a presence server such that the web servers of the other local networks receive a notification with the aggregated service record from the presence server based on subscriptions according to the existing presence service framework.

16. The arrangement according to claim 9, wherein the services in the aggregated service record are indicated by service universal resource locators each including a prefix identifying the first local network.

* * * * *